July 26, 1966     A. J. ZUERCHER     3,262,696

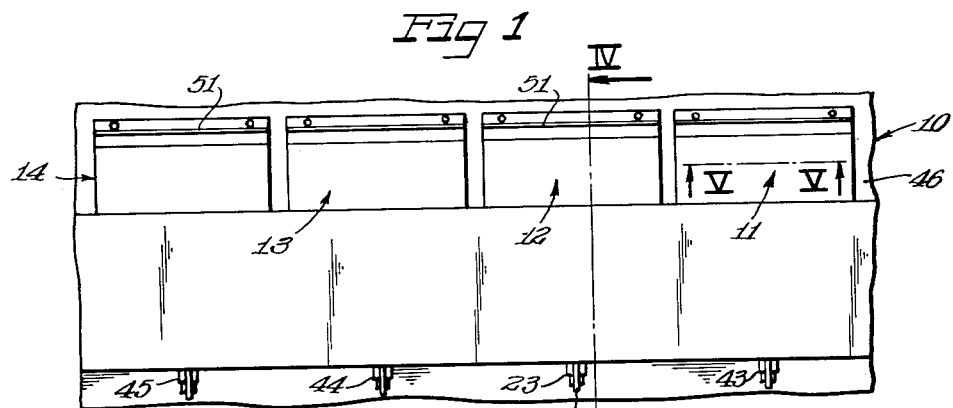
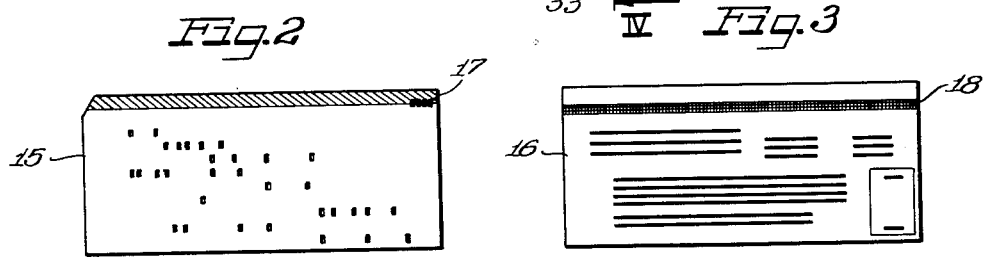
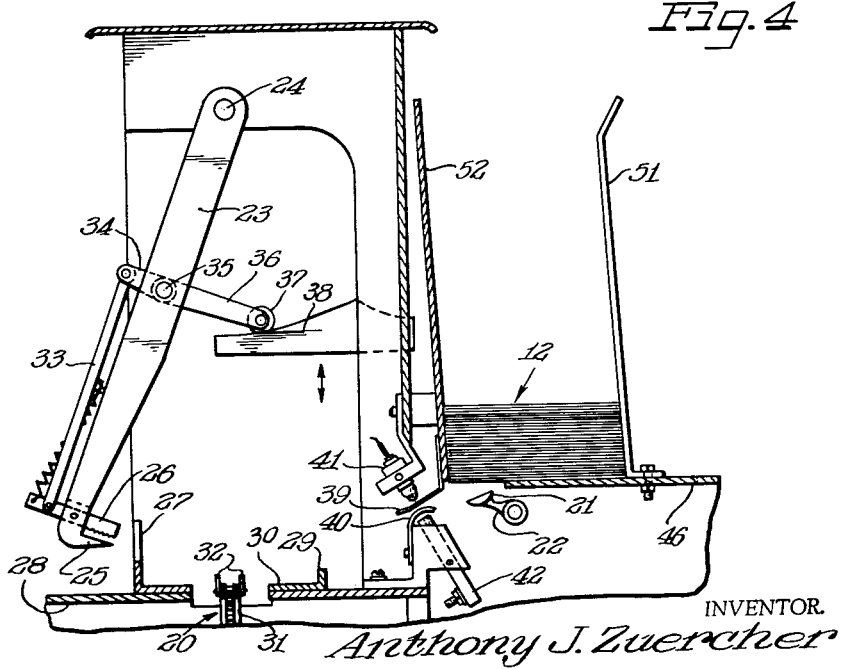

SEQUENCE CHECKING SYSTEM

Filed Feb. 18, 1963     2 Sheets-Sheet 2

INVENTOR.

Anthony J. Zuercher

BY

ATTORNEYS

United States Patent Office 3,262,696
Patented July 26, 1966

3,262,696
SEQUENCE CHECKING SYSTEM
Anthony J. Zuercher, Lansdale, Pa., assignor to Bell & Howell Company, Chicago, Ill., a corporation of Illinois
Filed Feb. 18, 1963, Ser. No. 259,087
2 Claims. (Cl. 270—58)

This invention relates to a sequence checking system operable in conjunction with assembling apparatus to insure the proper order of assembly of papers, cards or the like. The system of this invention is comparatively simple, requires a minimum number of component parts and yet is very efficient and reliable in operation.

An example of a type of assembling apparatus to which the invention may be applied is an inserting machine used in inserting bills, punched payment cards and other material into envelopes to be mailed to the customers of a telephone company. In such a machine, the bills may be disposed in a first stack, the payment cards in a second stack and additional material in other stacks, the stacks being disposed alongside of a conveyor. A transfer mechanism is operable to simultaneously move an item from each stack to the conveyor, the conveyor being then advanced, and the transfer mechanism being again operated to place a payment card on top of the bill transferred in the previous operation. Stacks of assembled materials are removed from the conveyor and inserted into envelopes which are sealed, stamped with postal indicia and mailed to customers. Such operations may be performed at a rapid rate and by way of example, up to 7200 envelopes per hour, or more, may be processed.

One difficulty with such machines is that if only one bill or payment card is missing from a stack, the remaining cards or bills might be assembled improperly and mailed to customers without detection of the error, to cause an enormous amount of trouble. Thus it is essential that the bills and cards be assembled in the proper order.

According to this invention a matching operation is used in which indicia are placed on items to be assembled and sensing means are provided to sense such indicia and to detect whether the items are in proper order.

According to a specific feature of the invention, indicia are placed on only a limited number of items of each group, with a fixed number of items without indicia being disposed between those bearing the indicia. By way of example, an indicium in the form of a black mark may be placed on every sixth bill and a corresponding indicium in the form of one or more punched holes may be placed on every sixth payment card. This greatly simplifies the placing of the indicia and also simplifies the sensing means and detection circuitry, without impairing the reliability of the system.

Another important feature of the invention relates to a memory system for responding to the sensing of an indicium on an item of one group and subsequently responding to the sensing of an indicium of an item of another group to permit operation with assembly apparatus of the type in which items are assembled in sequence, rather than simultaneously.

A further feature of the invention relates to the automatic shut-down of a machine when items are not in proper order.

Additional features of the invention relate to indicia sensing means and to detection circuitry operable to obtain highly efficient and reliable operation.

Other and more specific objects, features and advantages of the invention will become more fully apparent from the following detailed description taken in conjunction with the accompanying drawings which illustrate a preferred embodiment and in which:

FIGURE 1 is a top plan view of a portion of an assembling machine using a sequence checking system in accordance with the principles of this invention;

FIGURE 2 illustrates a punched card of a type used with the machine of FIGURE 1;

FIGURE 3 illustrates a bill of a type used with the machine of FIGURE 1;

FIGURE 4 is a sectional view taken substantially along line IV—IV of FIGURE 1;

Figure 5:
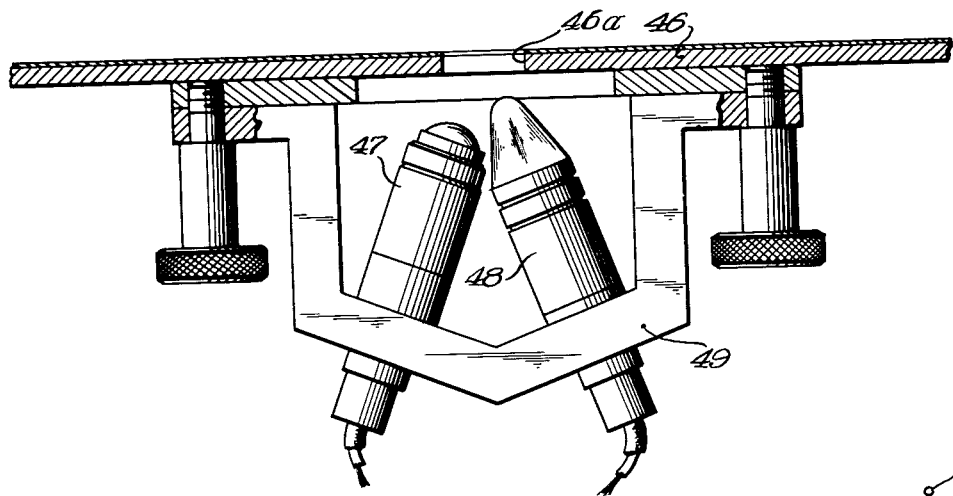
FIGURE 5 is a sectional view taken substantially along line V—V of FIGURE 1.

Reference numeral 10 generally designates an inserting machine, a portion of which is illustrated in FIGURE 1. The machine 10 was specifically designed for the assembly and insertion into envelopes of items of a number of groups such as, for example, bills or paper statements, punched cards and other material to be mailed to the customers of a telephone company. The illustrated portion of the machine 10 is used in feeding statements or bills from a stack 11, punched payment cards from a stack 12, and other materials from stacks 13 and 14 onto a conveyor from which assembled groups of materials are removed and inserted into envelopes which are sealed, stamped with postal indicia and mailed to customers.

FIGURE 2 illustrates a punched payment card 15 of the type stacked in the stack 12 which is mailed or presented by a customer along with his check or payment, and then processed by automatic data processing equipment.

FIGURE 3 illustrates a paper statement or bill which has imprinted thereon the name of the company, the customer's address, telephone number and date, and an itemized list of payments due for local and long distance calls, advertising, balance from last bill, etc. The customer's name may be so positioned as to be visible through a window in an envelope when inserted into the envelope.

In accordance with this invention, every sixth punched card is provided with an indicium in the form of four punched holes 17 in one corner thereof, as illustrated in FIGURE 2, and every sixth bill is provided with a black bar 18 on at least one face thereof. The sequence checking system of this invention operates to sense when a bill 16 having the bar 18 is fed from the stack 11 to the conveyor which is then operated to move the bill 16 to a position opposite the punched card stack 12. On the next cycle of operation of the feeding mechanism, a punched card 15 having the holes 17 therein should be fed from the stack 12 to be placed on top of the bill 16. Suitable sensing means are provided to determine whether a bill 15 having the holes 17 is so fed. If not, the sequence checking system of this invention operates to automatically shut down operation of the machine, whereupon the operator can determine the cause of the out-of-order relationship and correct the error. This can be accomplished before any envelopes are improperly processed for mailing to customers.

The cross-sectional view of FIGURE 4 diagrammatically illustrates the transferring or feeding mechanism used for transferring a card from the stack 12 to a conveyor generally designated by reference numeral 20. This mechanism is old in the art, by itself. In brief, a suction cup 21, connected to a suitable vacuum pump, is mounted on an arm 22 to be moved upwardly into engagement with the lower surface of the lowermost card, adjacent an edge thereof and is then moved downwardly to separate the edge portion of the lowermost card from the next higher card. An arm 23 on a shaft 24 is then moved to a position in which the turned-down edge portion of the lowermost card may be engaged between a finger 25 affixed to the lower end of the arm 23 and a finger 26 pivoted to the arm 23. With the card firmly grasped between the fingers 25 and 26, the arm 23 is rotated in the reverse direction until the card engages upstanding fingers 27 secured to a base plate 28, the fingers 25 and 26 being separated to allow the card to drop into a conveying channel defined by the fingers 27 and an upstanding ridge on a base plate 30 coplanar with the base plate 28. The base plates 28 and 30 have spaced parallel edges defining a slot in which a conveyor chain 31 is disposed, the conveyor chain having upstanding fingers 32 to engage the card. The chain 31 is journalled on suitable sprocket wheels which are driven by a suitable motor, not shown, and in time intervals between the transferring or feeding operations, the conveyor chain is moved through a distance equal to the distance between the center line of one stack and the center line of the next stack.

To operate the finger 26, it is connected through a link 33 to an arm 34 on a shaft 35 with an arm 36 on one end of the shaft 35 having a cam roller 37 engaging a cam plate 38. The cam plate 38, the shaft 24 and the arm 22, as well as the conveyor chain 31, are operated in properly timed relationship by a mechanism known in the art and therefore not shown or described in detail.

In moving from the lower end of the stack 12 to the conveyor 20, the card passes between guides 40, and the corner of the card, which may or may not have the holes 17 therein, passes between a light source 41 and a photocell 42, to thereby sense whether or not there are holes in the corner of the card. The use of the signal from the photocell 42 is described hereinbelow in connection with the circuit diagram of FIGURE 6.

To transfer a bill from the stack 11 to the conveyor 20, a mechanism is provided which is substantially identical to that illustrated in FIGURE 4, including an arm 43, a portion of which is illustrated in FIGURE 1. Similar mechanisms are used for transferring material from stacks 13 and 14 to the conveyor, including arms 44 and 45, portions of which are also shown in FIGURE 1.

To sense the existence or non-existence of a black bar 18 on the lowermost bill of the stack 11, an opening 46a is provided in a plate 46 which is used to support the stack 11, as well as the stacks 12, 13 and 14. Below the opening 46a a light source 47 is provided to illuminate the portion of the lowermost bill overlying the opening 46a, and a photocell 48 is provided to sense the amount of light reflected from the illuminated portion of the bill. The light source 47 and the photocell 48 are supported from the plate 46 by means of a bracket 49. It may here be noted that only a comparatively small central portion of the bar 18 is used for sensing purposes and, if desired, only that portion need be blackened on every sixth bill.

It may also be here noted that suitable guide plates 51 and 52 are provided for engaging the edges of the bills, cards and other material in the stacks 11–14.

Figure 6:
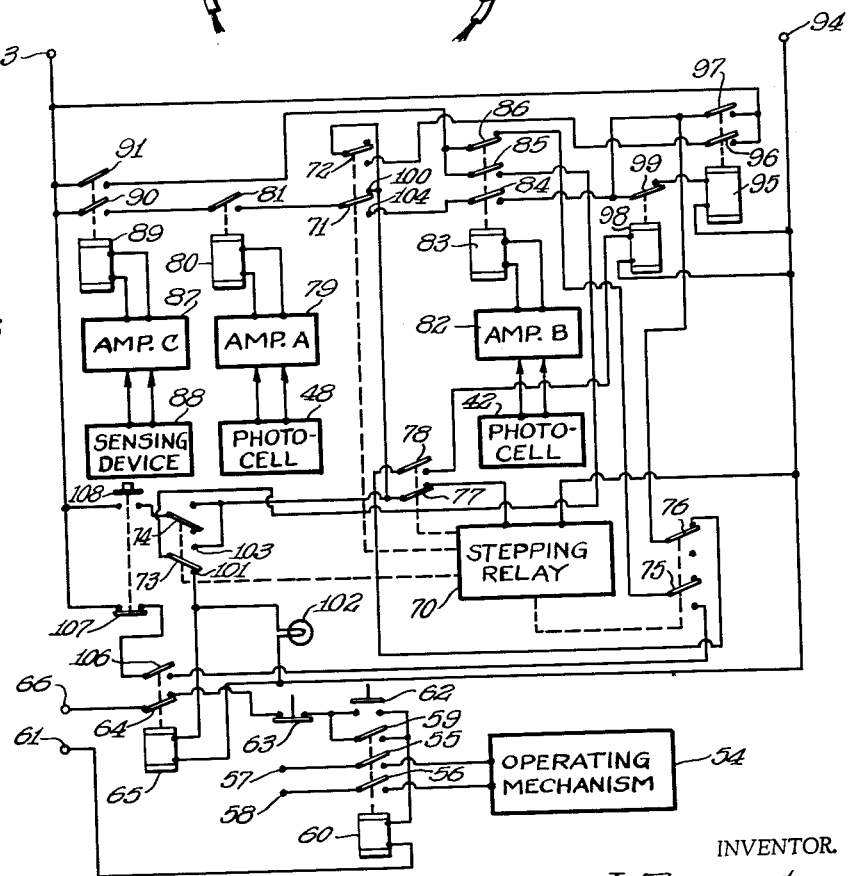
FIGURE 6 is a circuit diagram of the sequence checking system used with the machine of FIGURE 1.

Referring now to the circuit diagram of FIGURE 6, the operating mechanism of the machine, as diagrammatically illustrated by the block 54, and which may include one or more electric motors and other electrically operated devices, is connected through contacts 55 and 56 to terminals 57 and 58, connected to a suitable voltage source. The contacts 55 and 56 and also a holding contact 59 are operated by energization of a coil 60. One terminal of the coil 60 is connected to a terminal 61 and the other terminal thereof is connected through the parallel combination of the holding contact 59 and a start button 62, through a stop button 63, and through a normally closed contact 64 of a fault relay 65 to a terminal 66, terminals 61 and 66 being connected to a suitable control voltage source.

With this circuit, operation of the start button 62 energizes the coil 60 to close the holding contact 59 and to close the contacts 55 and 56 to apply power to the operating mechanism 54. The mechanism remains operative until the stop button 63 is operated, or until the fault relay 65 is energized to open the contact 64.

The fault relay 65 is energized in response to any out-of-order relationship between bills and payment cards. The circuit for performing this function includes a stepping relay 70 of a type known in the art, which includes a first cam for operating a pair of contacts 71 and 72, a second cam for operating a pair of contacts 73 and 74, and a third cam for operating a pair of contacts 75 and 76. The stepping relay 70 also includes mechanism for operating a pair of contacts 77 and 78.

The circuit further includes an amplifier 79 having an input connected to the photocell 48 and having an output connected to a relay 80 having a normally open contact 81; an amplifier 82 having an input connected to the photocell 42 and an output connected to a relay 83 having normally open contacts 84 and 85 and a normally closed contact 86; and an amplifier 87 having an input connected to a sensing device 88 and an output connected to a relay 89 having normally open contacts 90 and 91. The sensing device 88 is associated with the operating mechanism to be operated at a certain point in the cycle of operation of the feeding mechanism, when the corner of a card is positioned between the light source 41 and the photocell 42, and also when the black bar of a bill is positioned over the opening 45.

The circuit further includes a pair of input terminals 93 and 94 connected to a suitable D.C. source, a relay 95 having normally open contacts 96 and 97 and a relay 98 having a normally closed contact 99.

In operation, the sensing device 88 applies a signal to the amplifier 87 to energize the relay 89 and close the contacts 90 and 91 at a certain point in the cycle of operation. If at that time, the lowermost bill being transferred has a black bar thereon, the low intensity light on the photocell 48 will result in the application of an input voltage to the amplifier 79 of a polarity such that the relay 80 is energized to close the contact 81. A circuit is then completed to the contact 71 which is engaged with a fixed contact 100 connected through the contact 77 to one terminal of the stepping relay 70, the other terminal thereof being connected to the input terminal 94. The stepping relay 70 is then advanced one step to move each of the contacts 71–76 to a position opposite the illustrated position. The contact 77 is momentarily opened to interrupt energization of the relay 70 as it approaches its new position.

If on the next cycle of operation of the machine when the sensing device 88 applies a signal through amplifier 87 to energize the relay 89 and close the contacts 90 and 91, the photocell 42 does not respond to light through holes of the card, the amplifier 82 energizes the relay 83 to close contacts 84 and 85 and open contact 86. A circuit is then completed from contact 91 through contact 85 and through contact 73, now engaged with a fixed contact 101 connected to the fault relay 65, to energize the fault relay 65, open the contact 84 and deenergize the coil 60 to deenergize the operating mechanism. A fault signal light 102, in parallel with the fault relay 65, is also energized.

If, however, the photocell 42 on the second cycle does respond to light through holes in the card, the relay 83 will not be energized and the fault relay 65 will not be energized, so that the machine will continue to operate. At this time, a circuit is completed through contact 91, contact 86, contact 73, then engaged with a contact 103, and through the contact 77 to the stepping relay 70 to advance the relay one step and to return all of the contacts 71–76 to the initial positions thereof as illustrated.

In some cases, it may be desirable to handle consecutive sets of bills and cards with matching black marks and holes. In that case, a black mark appearing on a bill, on the second cycle, would cause the amplifier 79 to energize relay 80 to close contact 81 and to complete a circuit through contact 71, then engaged with a contact 104, and through the contact 85 and the contact 99 to energize the relay 95, to close the contact 96 thereof and to complete a circuit through the contact 72 to the stepping relay 70. The stepping relay 70 is then advanced through two steps, to again position the contacts 71–76 in positions opposite the illustrated positions, and the machine continues to operate. In this operation, the relay 98 is momentarily energized by closing of the contact 78 to deenergize the relay 95.

If, however, upon detection of a black mark in the second cycle of operation, a card should appear without holes, the relay 83 energizes to close its contact and to energize the fault relay 65.

When the fault relay is energized, a holding contact 106 is closed to maintain it in an energized condition. To reset the circuit, after correction of a fault, a pair of push button switches 107 and 108 are operated, the switch 107 being opened to deenergize the fault relay 65, while the switch 108 is closed to advance the stepping relay 70 and position the contacts 71–76 in the initial positions thereof as illustrated.

Although exemplification of the principles of the present invention is referred to herein as checking a sequence progression by matching certain ones of groups of forms, it should be understood that such terminology also comprehends matching all of the forms handled, for example, as might occur by providing means for matching indicia located at different selected positions on the forms to identify different types or items of information for the respective forms.

It will be understood that modifications and variations may be effected without departing from the spirit and scope of the novel concepts of this invention.

I claim as my invention:

1. Apparatus for checking the sequence of assembly in an assembling apparatus having plural stacks of documentary items to be assembled together, comprising:

guide means for holding separate stacks of said items each having control items with specific indicia interposed at intervals throughout each separate stack;

a common transport conveyor adjacent said guide means;

each of said stack guide means having feeding means for feeding a single item in sequential order from the corresponding stack onto said conveyor;

each feeding means having a sensing means positioned to sense the presence of a specific indicia of a control item as it passes from the stack to said conveyor;

and control means for operating the apparatus through phase cycles wherein items from the successive stacks are deposited on the conveyor sequentially and moved by the conveyor in timed relation to said feeding means for collation with the successively deposited items from the succeeding stacks, and including means responsive to signals transmitted by said sensing means to stop operation of the apparatus following indication by said sensing means that items have been mismatched but allowing the machine to continue operation when a properly matched relation is sensed.

2. Apparatus as defined in claim 1, in which said control items are interposed at predetermined intervals with items lacking said specific indicia, and said feeding means comprising photoelectric assemblies.

References Cited by the Examiner

UNITED STATES PATENTS

| | | |
|---|---|---|
| 2,214,593 | 9/1940 | Mustin et al. |
| 2,324,834 | 7/1943 | Gurwick. |
| 2,379,828 | 7/1945 | Rubidge et al. _____ 270—58 X |
| 3,071,369 | 1/1963 | Ambrogi _____ 270—58 X |

EUGENE R. CAPOZIO, *Primary Examiner.*

NELSON M. ELLISON, *Assistant Examiner.*